United States Patent
Matsuo et al.

(10) Patent No.: US 8,965,687 B2
(45) Date of Patent: Feb. 24, 2015

(54) NAVIGATION DEVICE HAVING IN-TUNNEL POSITION ESTIMATION FUNCTION

(75) Inventors: Shigeru Matsuo, Hitachinaka (JP); Katsuaki Tanaka, Hitachinaka (JP)

(73) Assignee: Clarion Co., Ltd., Saitama-shi (JP)

( * ) Notice: Subject to any disclaimer, the term of this patent is extended or adjusted under 35 U.S.C. 154(b) by 246 days.

(21) Appl. No.: 13/577,765

(22) PCT Filed: Feb. 16, 2011

(86) PCT No.: PCT/JP2011/053262
§ 371 (c)(1),
(2), (4) Date: Oct. 2, 2012

(87) PCT Pub. No.: WO2011/105264
PCT Pub. Date: Sep. 1, 2011

(65) Prior Publication Data
US 2013/0018578 A1    Jan. 17, 2013

(30) Foreign Application Priority Data

Feb. 24, 2010    (JP) ................................. 2010-038103

(51) Int. Cl.
| | |
|---|---|
| *G01C 21/00* | (2006.01) |
| *G09B 29/10* | (2006.01) |
| *G09B 29/00* | (2006.01) |
| *G08G 1/16* | (2006.01) |
| *G01C 21/30* | (2006.01) |

(52) U.S. Cl.
CPC ............ *G01C 21/005* (2013.01); *G09B 29/106* (2013.01); *G09B 29/007* (2013.01); *G08G 1/168* (2013.01); *G01C 21/30* (2013.01)
USPC ....................................................... 701/431

(58) Field of Classification Search
None
See application file for complete search history.

(56) References Cited

U.S. PATENT DOCUMENTS

| 8,417,443 B2 * | 4/2013 | Ishikawa ....................... 701/119 |
| 2001/0007967 A1 * | 7/2001 | Yamamoto et al. ........... 701/208 |
| 2004/0138809 A1 | 7/2004 | Mukaiyama |

(Continued)

FOREIGN PATENT DOCUMENTS

| CN | 101114018 A | 1/2008 |
| CN | 101286267 A | 10/2008 |

(Continued)

OTHER PUBLICATIONS

Japanese Office Action and English translation thereof Dated May 7, 2013 {Five (5) Pages}.

(Continued)

*Primary Examiner* — Thomas Tarcza
*Assistant Examiner* — Adam Alharbi
(74) *Attorney, Agent, or Firm* — Crowell & Moring LLP (57) ABSTRACT

A navigation device that includes a map data base in which map information is stored and a positioning unit that determines a current position based upon a radio wave signal received from a satellite, contains: a tunnel detection unit that detects a tunnel that is present ahead on a road where the navigation device is moving; a travel data acquisition unit that acquires travel data of another vehicle from an information center; and a position estimation unit that in case the tunnel detection unit detects a presence of a tunnel ahead on a road and the travel data acquisition unit acquires from the information center travel data of another vehicle that has traveled through the detected tunnel, estimates a current position of the navigation device in the detected tunnel using a travel speed in the detected tunnel in the acquired travel data as a movement speed of the navigation device.

6 Claims, 11 Drawing Sheets

(56) References Cited

U.S. PATENT DOCUMENTS

| | | | |
|---|---|---|---|
| 2006/0226968 A1* | 10/2006 | Tengler et al. | 340/466 |
| 2008/0114545 A1* | 5/2008 | Takaoka et al. | 701/220 |
| 2009/0140887 A1* | 6/2009 | Breed et al. | 340/990 |
| 2010/0169013 A1* | 7/2010 | Nakamura et al. | 701/213 |
| 2012/0053834 A1* | 3/2012 | Loomis | 701/510 |

FOREIGN PATENT DOCUMENTS

| | | | |
|---|---|---|---|
| JP | 2003-161622 A | 6/2003 |
| JP | 2004-185428 A | 7/2004 |
| JP | 2006-293435 A | 10/2006 |
| JP | 2006-349405 A | 12/2006 |
| JP | 2007-101379 A | 4/2007 |

OTHER PUBLICATIONS

European Search Report dated Dec. 10, 2013 (seven (7) pages).

Chinese Office Action dated Jul. 3, 2014, including English translation (nine (9) pages).

International Search Report dated Mar. 15, 2011 (one (1) page).

\* cited by examiner

PROBE DB FORMAT

| VEHICLE ID | TIME | POSITION |
|---|---|---|
| 001 | 13:24:56 | LATITUDE : 00001<br>LONGITUDE : 00002 |
| 002 | 13:24:59 | LATITUDE : 00100<br>LONGITUDE : 00200 |
| 001 | 14:00:26 | LATITUDE : 00003<br>LONGITUDE : 00004 |
| 002 | 14:00:29 | LATITUDE : 00110<br>LONGITUDE : 00210 |
| ⋮ | ⋮ | ⋮ |

FIG.5

IN-TUNNEL SPEED DB FORMAT

| TUNNEL NUMBER | TIME | SPEED | START POSITION | END POSITION |
|---|---|---|---|---|
| R223 | 13:24:56 | 50km/h | LATITUDE:00001<br>LONGITUDE:00002 | LATITUDE:00005<br>LONGITUDE:00006 |
|  | 13:25:23 | 60km/h | LATITUDE:00010<br>LONGITUDE:00020 | LATITUDE:00030<br>LONGITUDE:00040 |
|  | ⋮ | ⋮ | ⋮ | ⋮ |
| R224 |  |  | ⋮ | ⋮ |

NAVIGATION DEVICE HAVING IN-TUNNEL POSITION ESTIMATION FUNCTION

TECHNICAL FIELD

The present invention relates to a car navigation device that uses a global positioning system (GPS), in particular, relates to a car navigation device that can estimate a position of a subject vehicle in a tunnel where a radio wave from the GPS cannot be received.

BACKGROUND ART

A common car navigation device determines the position of a subject vehicle using a GPS or sensor values of such as a gyroscope and a vehicle speed pulse of the vehicle. In the GPS, radio waves from a plurality of GPS satellites are received and a difference in arrival speed between the radio waves is used to determine an absolute position. In addition, the values of the gyroscope and the vehicle speed pulse are used to determine a relative position of the vehicle from the movement amount thereof if the radio wave from the GPS cannot be received.

However, for achieving a car navigation device at a lower price, there is a car navigation device that does not use a gyroscope and a vehicle speed pulse but only uses a GPS so as to determine the position. Such car navigation device has a problem of being unable to position the subject vehicle in a place where the GPS signal cannot be received and unable to update a map screen display and guide a route. In a long tunnel, in particular, there is a problem of being unable to perform guidance for a long term and, where there is a branching immediately after a tunnel, unable to perform guidance in the tunnel.

Then, Japanese Laid-Open Patent Publication No. 2003-161622 discloses a method by which in a circumstance where a GPS radio wave is blocked such as in a tunnel, a positioning information service of a mobile phone is used so as to determine the position of a subject vehicle without using a gyroscope and a vehicle speed pulse.

CITATION LIST

Patent Literature

[PATENT LITERATURE 1] Japanese Laid-Open Patent Publication No. 2003-161622

SUMMARY OF INVENTION

Technical Problem

Normally, a car navigation device updates the subject vehicle position in a cycle of approximately one second and performs map display and guidance. However, with the technique stated in the patent literature 1, time lag occurs before a positioning result is acquired due to performing communication with a base station in each positioning and, if a several seconds to several tens of seconds of delay occurs due to communication with a base station in each positioning, there will be a difference between the positioning result and the actual position. In addition, positioning by a base station has a wide range of positioning accuracy, which may cause a positioning error by several ten m to approximately 1 km.

According to the 1st aspect of the present invention, a navigation device that includes a map data base in which map information is stored and a positioning unit that determines a current position based upon a radio wave signal received from a satellite, comprises: a tunnel detection unit that detects a tunnel that is present ahead on a road where the navigation device is moving; a travel data acquisition unit that acquires travel data of another vehicle from an information center; and a position estimation unit that in case the tunnel detection unit detects a presence of a tunnel ahead on a road where the navigation device is moving and the travel data acquisition unit acquires from the information center travel data of another vehicle that has traveled through the detected tunnel, estimates a current position of the navigation device in the detected tunnel using a travel speed in the detected tunnel in the acquired travel data as a movement speed of the navigation device.

According to the 2nd aspect of the present invention, in the navigation device according to the 1st aspect, it is preferred that: the travel data acquired from the information center include position information of another vehicle and time information of measurement of the position information; and if the acquired travel data include sets of travel data by a plurality of vehicles, the position estimation unit sorts sets of speed information of sections that each correspond to the tunnel in each set of travel data in order of proximity to an inlet of the tunnel, calculates speed information for each of sections divided by the position information, and determines latest speed information in each of the divided sections as a movement speed of the navigation device in each of the divided sections of the tunnel.

According to the 3rd aspect of the present invention, in the navigation device according to the 1st or 2nd aspect, it is preferred that for a section in the tunnel where speed data cannot be acquired from travel data of the other vehicle, speed information, which is speed data into which traffic information pertaining to the tunnel has been converted, is acquired from the information center and is determined as a movement speed of the navigation device.

According to the 4th aspect of the present invention, in the navigation device according to any one of the 1st to 3rd aspects, it is preferred that: the navigation device further comprises an inter-vehicle communication unit that performs data transmission and reception with another vehicle; and in case the tunnel detection unit detects a presence of a tunnel ahead on a road where the navigation device is moving, the inter-vehicle communication unit performs communication with another vehicle that is traveling in a same direction on a same road and the position estimation unit determines a travel speed received from the other vehicle as a movement speed of the navigation device.

According to the 5th aspect of the present invention, a position estimation method for a navigation device that comprises a map data base in which map information is stored and a positioning unit that determines a current position based upon a radio wave signal received from a satellite, comprises: detecting a tunnel that is present within a predetermined distance ahead on a road where the navigation device is moving; in case a presence of a tunnel is detected ahead on a road where the navigation device is moving, acquiring from an information center travel data of another vehicle that has traveled through the detected tunnel; and estimating a current position of the navigation device in the tunnel using a travel speed in the tunnel in the acquired travel data as a movement speed of the navigation device.

According to the 6th aspect of the present invention, in the position estimation method for a navigation device according to the 5th aspect, it is preferred that: the travel data acquired from the information center include position information of another vehicle and time information of measurement of the position information; and if the acquired travel data include sets of travel data by a plurality of vehicles, sets of speed information of sections that correspond to the tunnel in each set of travel data are sorted in order of proximity to an inlet of the tunnel, speed information is calculated for each of sections divided by the position information, and latest speed information in each of the divided sections is determined as a movement speed of the navigation device in each of the divided sections of the tunnel.

According to the 7th aspect of the present invention, in the position estimation method for a navigation device according to the 5th or 6th aspect, it is preferred that for a section in the tunnel where speed data cannot be acquired from travel data of the other vehicle, speed information, which is speed data into which traffic information pertaining to the tunnel that has been converted, is acquired from the information center and determined as a movement speed of the navigation device.

According to the 8th aspect of the present invention, in the position estimation method for a navigation device according to any one of the 5th to 7th aspects, it is preferred that in case a presence of a tunnel is detected ahead on a road where the navigation device is moving, communication with another vehicle that is traveling in a same direction on a same road is performed by an inter-vehicle communication in which transmission and reception of data is further performed with a vehicle, and a travel speed received from the other vehicle is determined as a movement speed of the navigation device.

Advantageous Effect of the Invention

According to the present invention, even a car navigation device that is mounted with, for example, a GPS positioning unit and cannot perform Dead-Reckoning is allowed to estimate the subject vehicle position in a tunnel by acquiring a travel speed in the tunnel from another vehicle.

DESCRIPTION OF EMBODIMENTS

The car navigation device according to an embodiment of the present invention will now be explained with reference to the drawings.

Figure 1:
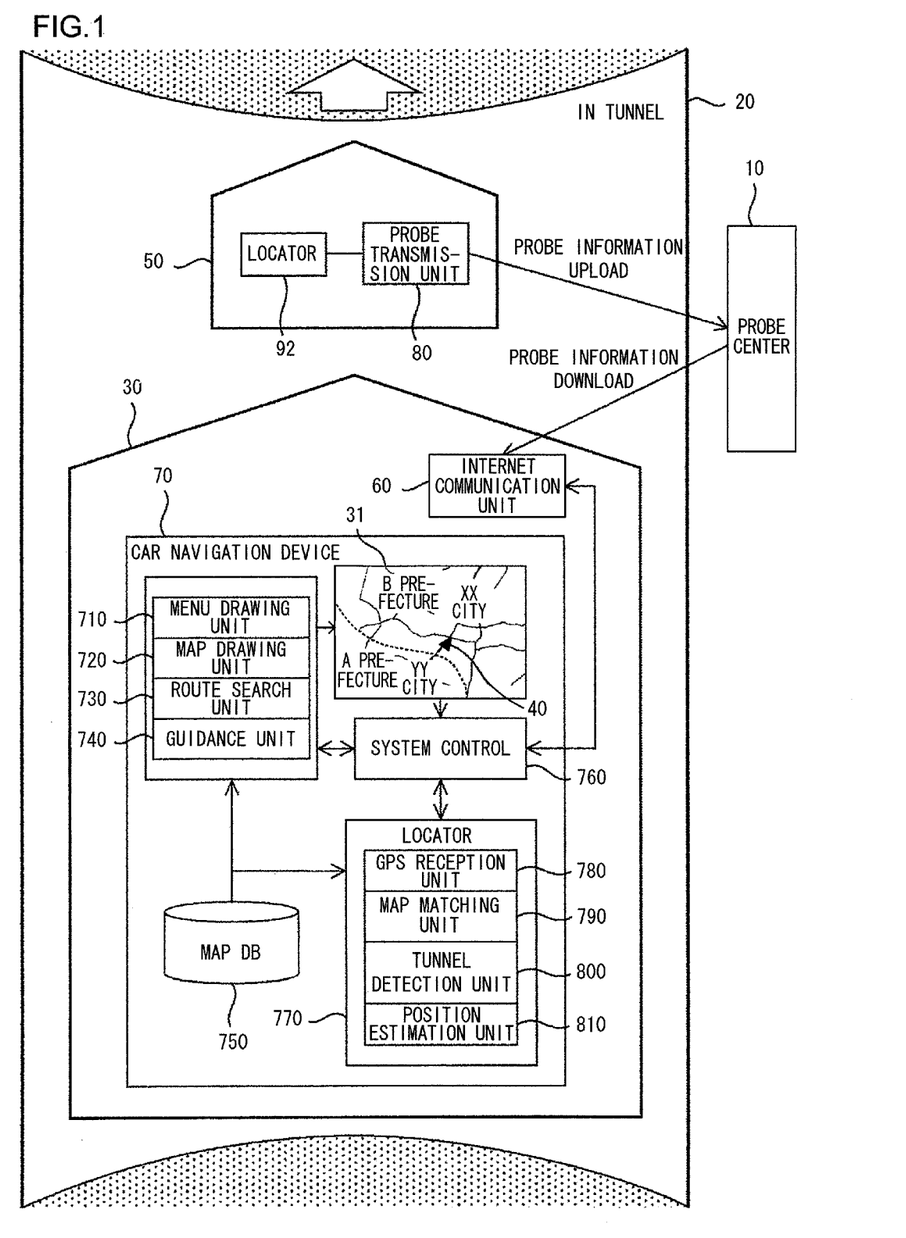
FIG. 1 A diagram that shows a whole structure of the first embodiment of the present invention.

FIG. 1 shows the whole structure of a system in which a car navigation device according to the first embodiment of the present invention is applied. While the car navigation device in the first embodiment will now be explained as a car navigation device 70 that is mounted to a vehicle 30, the car navigation device is not always limited to that mounted to the vehicle 30 and may be a navigation device that can move along with the vehicle 30. The car navigation device 70 using the invention of this application is mounted to the vehicle 30 that cannot perform Dead-Reckoning in a tunnel 20. The vehicle 30 further includes an Internet communication unit 60 for external communication. The processing for the car navigation device 70 to guide the vehicle 30 along a route is conditioned upon successful determination of a current position of the vehicle 30. Thus, if there is a branching immediately after a tunnel, guidance in the tunnel is required and it is necessary for the car navigation device 70 to determine the current position also in the tunnel. However, since the car navigation device 70 performs positioning using a GPS, it is incapable of positioning in a tunnel where a radio wave of the GPS cannot be received and, as a result, incapable of displaying at a correct position a subject vehicle position mark 40 on a map displayed onto a display screen 31 based upon the positioning result by the GPS.

Then, immediately before entering the tunnel 20 or in the tunnel, the vehicle 30 accesses to the probe center 10 and downloads probe information uploaded when another vehicle (the vehicle 50 in this example) is traveling through the tunnel 20. The probe center 10 collects probe information from a plurality of vehicles and delivers the same to each of vehicles. It is assumed that the preceding vehicle 50 can position itself even in a tunnel using the locator 92, which can perform Dead-Reckoning, and uploads the subject vehicle position to the probe center 10 as probe information at predetermined time intervals (e.g., 30 seconds) by a probe transmission unit 80.

The vehicle 30 calculates an in-tunnel travel speed from probe information of the preceding vehicle 50 downloaded from the probe center 10, deems the speed as the speed of the present subject vehicle, and displays the subject vehicle position mark 40 onto a map displayed on the display screen 31.

The car navigation device 70 includes a menu drawing unit 710 for setting a destination of the navigation, a map drawing unit 720 for displaying a map, a route search unit 730 for searching a route from a current position to the destination, a guidance unit 740 that generates guidance information in accordance with the route, a map data base (DB) 750 in which a map and destination information are stored, a locator 770 that determines the subject vehicle position, a system control 760 that controls the whole system, and the display screen 31 on which a map and the subject vehicle position mark 40 are displayed. In addition, the car navigation device 70 can be connected with the Internet by the Internet communication unit 60. The locator 770 determines the subject vehicle position in a cycle by a GPS reception unit 780 that receives a radio wave from the GPS and determines the position of the current position. A map matching unit 790, based upon positioning data that have been output from the GPS reception unit 780, specifies the road name (or number) on which the vehicle is traveling and the subject vehicle position on the road from the map information of the map DB 750. A tunnel detection unit 800, based upon the information of the road specified by the map matching unit 790, detects a presence of a tunnel in front of the subject vehicle and, if any, calculates the distance to the tunnel. A position estimation unit 810 estimates the subject vehicle position in a tunnel based upon probe information of another vehicle downloaded from the probe center 10.

Figure 3:
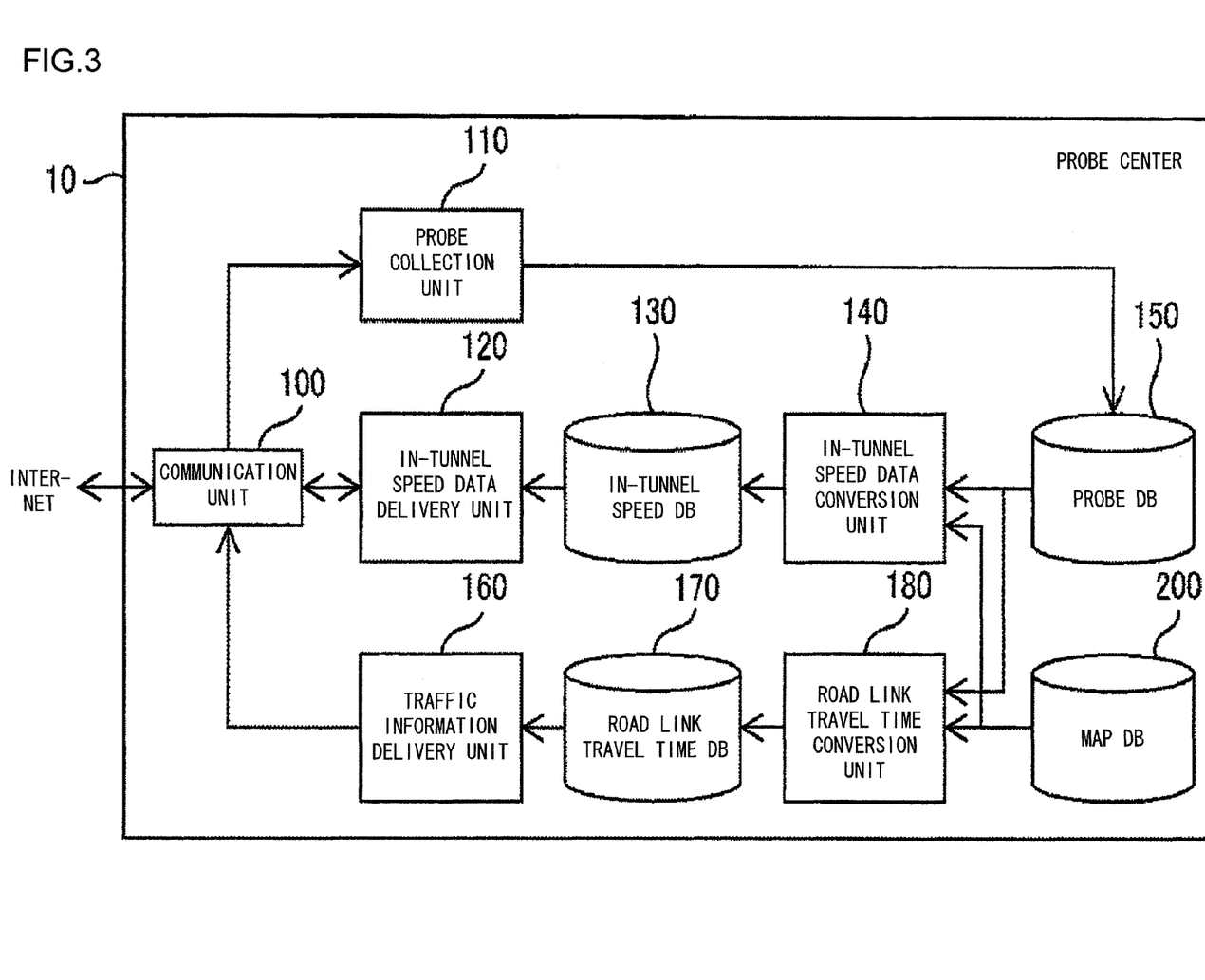
FIG. 3 A diagram that shows a structure of a probe center 10.

FIG. 3 is a diagram that shows the structure of the probe center 10. The probe center 10 includes a probe collection unit 110 that collects probe information that is sent from a vehicle via a communication unit 100 for connecting to the Internet, the probe DB 150 in which the collected probe information is temporality stored, an in-tunnel speed data conversion unit 140 that generates in-tunnel vehicle speed information for each tunnel from the probe information stored in the probe DB 150, an in-tunnel speed DB 130 in which the generated in-tunnel speed information is stored, and an in-tunnel speed data delivery unit 120 that accepts a request from a vehicle via the communication unit 100 and, upon the request, delivers in-tunnel speed data to the vehicle that sent the request.

A map DB 200 stores therein map data for making a decision as to what road the collected probe information indicates data of and what tunnel the data are at. In the map data, each road is managed by a road section called a road link and each road link is associated with an identification number and road shape data (dot sequence of position data). From the collected probe information, a road link travel time conversion unit 180 acquires for each road link traveling time during which a vehicle travels along the road link, performs statistical processing, and creates traffic information. The created traffic information is stored into a road link travel time DB 170. The traffic information stored in the road link travel time DB 170 is delivered by a traffic information delivery unit 160 upon a request from the vehicle.

Figure 4:
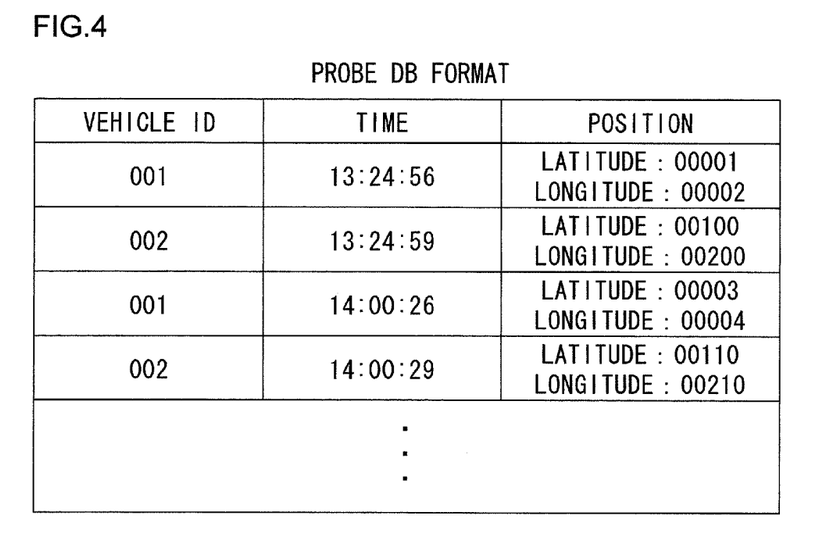
FIG. 4 A table that shows a format of a probe DB 150.

FIG. 4 is a table that shows a format of the probe DB 150. This table is constituted with a vehicle ID for identifying which vehicle the probe information has been transmitted from, transmission time of each datum recorded by the vehicle, and position data that indicate by latitude and longitude a position determined when transmitting the probe information. The probe center 10 receives and records probe information transmitted from each vehicle every 30 seconds. As a result, based upon two pieces of probe information with the same vehicle ID, a distance between two points is calculated from the difference between the points and an elapsed time (30 seconds) between the two points is calculated from the difference in time, thereby calculating the travel speed.

Figure 5:
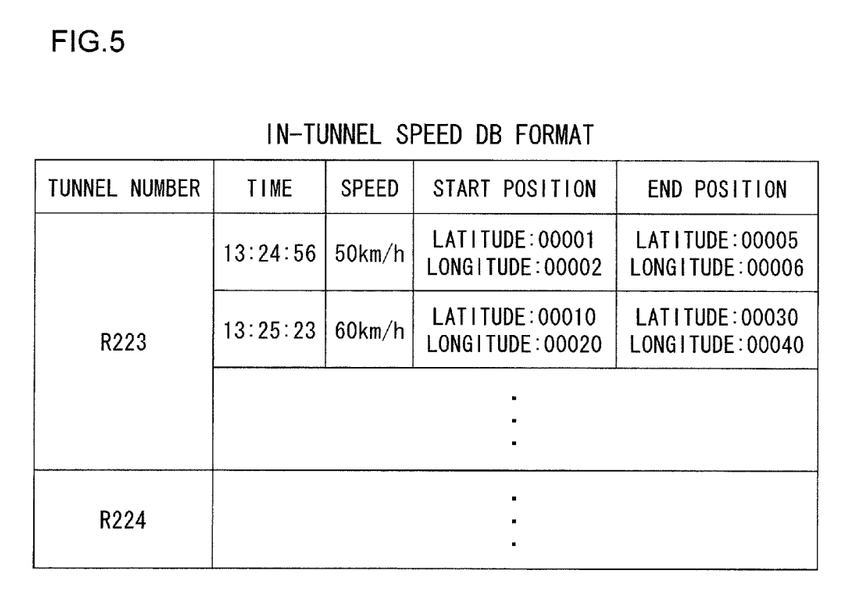
FIG. 5 A table that shows a format of an in-tunnel speed DB.

FIG. 5 is a table that shows a format of the in-tunnel speed DB 130. This table constituted with a tunnel number for identifying a tunnel, time at which the vehicle speed in the tunnel is measured, the speed, and position information (start position and end position) of two points, i.e., the start of the measurement and the end of the measurement of the two pieces of probe information used to measure the speed. Since the probe information is not measured at the inlet (entrance) and outlet (exit) of a tunnel, each datum has different start position and end position. Accordingly, since with one datum, merely a part of section of a tunnel may be measured, a plurality of data are held for one tunnel so that speed information is recorded for the whole tunnel.

Figure 6:
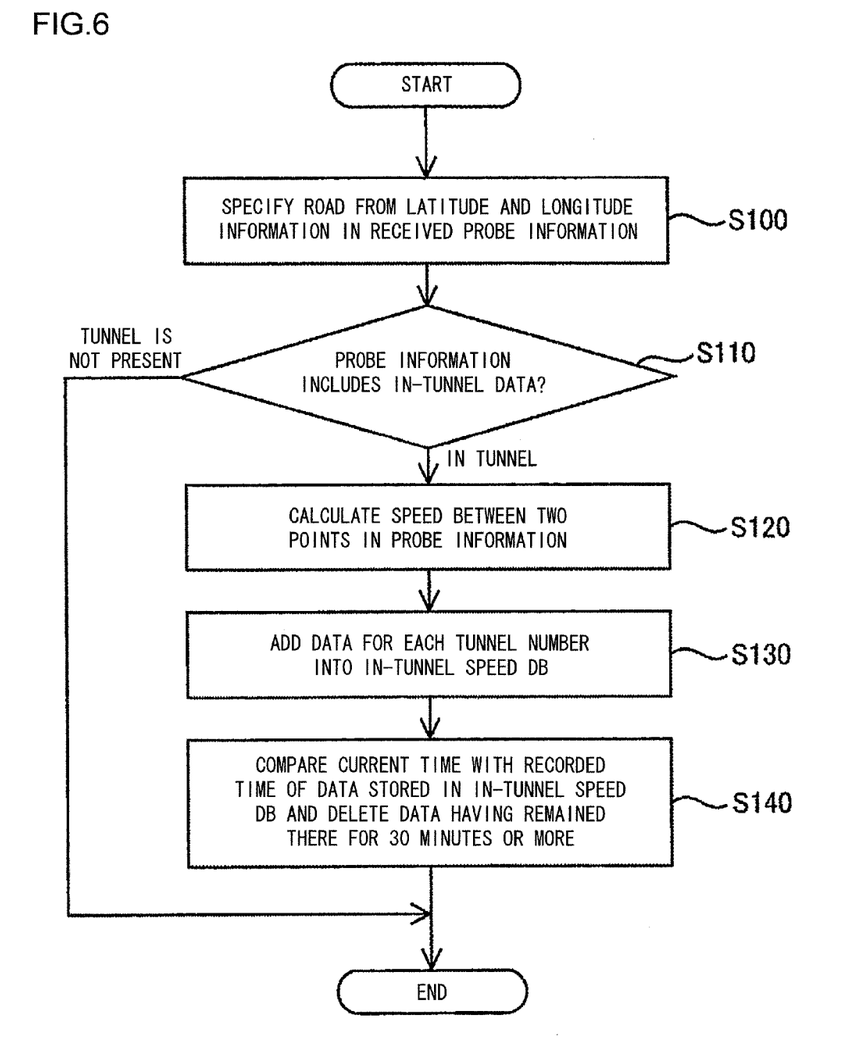
FIG. 6 A flowchart to calculate in-tunnel speed data.

FIG. 6 shows the flow of processing at the in-tunnel speed data conversion unit 140 of the probe center 10 that calculates in-tunnel vehicle travel speed data. This processing is started every time the probe collection unit 110 receives probe information from a vehicle and stores it into the probe DB 150. Firstly, latitude and longitude information in probe information received from a vehicle via the communication unit 100 and the probe collection unit 110 is matched with the map DB 200 and thus the road where the vehicle is traveling is specified or identified (S100). Next, attribute information of the specified road is read out from the map DB 200. The presence of a tunnel in each road and, if one is present, its position information are recorded in the road attribute information. Using this road attribute information, a decision is made as to whether or not a tunnel is present in the firstly specified road where the vehicle is currently traveling. If a tunnel is present in the road where the vehicle is currently traveling, the previous probe information transmitted by the vehicle that has transmitted the probe information received by the probe center 10 is read out from the probe DB 150 based upon the vehicle ID and time information. Then, the position on the road is calculated by latitude and longitude information indicated by the data of the previous probe information having been transmitted by the same vehicle. Due to the difference between the previous latitude and longitude information, which is mentioned above, and the current latitude and longitude information, the direction in which the vehicle is traveling on the road and the travel range on the road are specified.

Based upon the travel range and direction of the vehicle that are thus calculated, a decision is made as to whether or not the vehicle has traveled in the tunnel and a decision is made as to whether or not the probe information includes data of when the vehicle was traveling in the tunnel (S110). If the vehicle has traveled even in a part of the tunnel, the distance on the road between the two points that correspond to the position information in the previous probe information and the current probe information is calculated from road shape data of the map DB 200, the time required to pass through the road section is calculated from the difference in time information between the previous probe information and the current probe information, and thus the speed at which the vehicle travels in the section is calculated (S120). The speed data are recorded into the in-tunnel speed DB 130 for each tunnel number (S130). After that, the current time and recorded time of the data stored in the in-tunnel speed DB are compared and, if there are data that have been in the in-tunnel speed DB for 30 minutes or more at the current time, the data are deleted (S140). This is because data that have been in the in-tunnel speed DB for a certain period of time (30 minutes in this example) are deemed to be useless speed information due to its reduced reliability caused by change in the road situation during that period of time.

Figure 7:
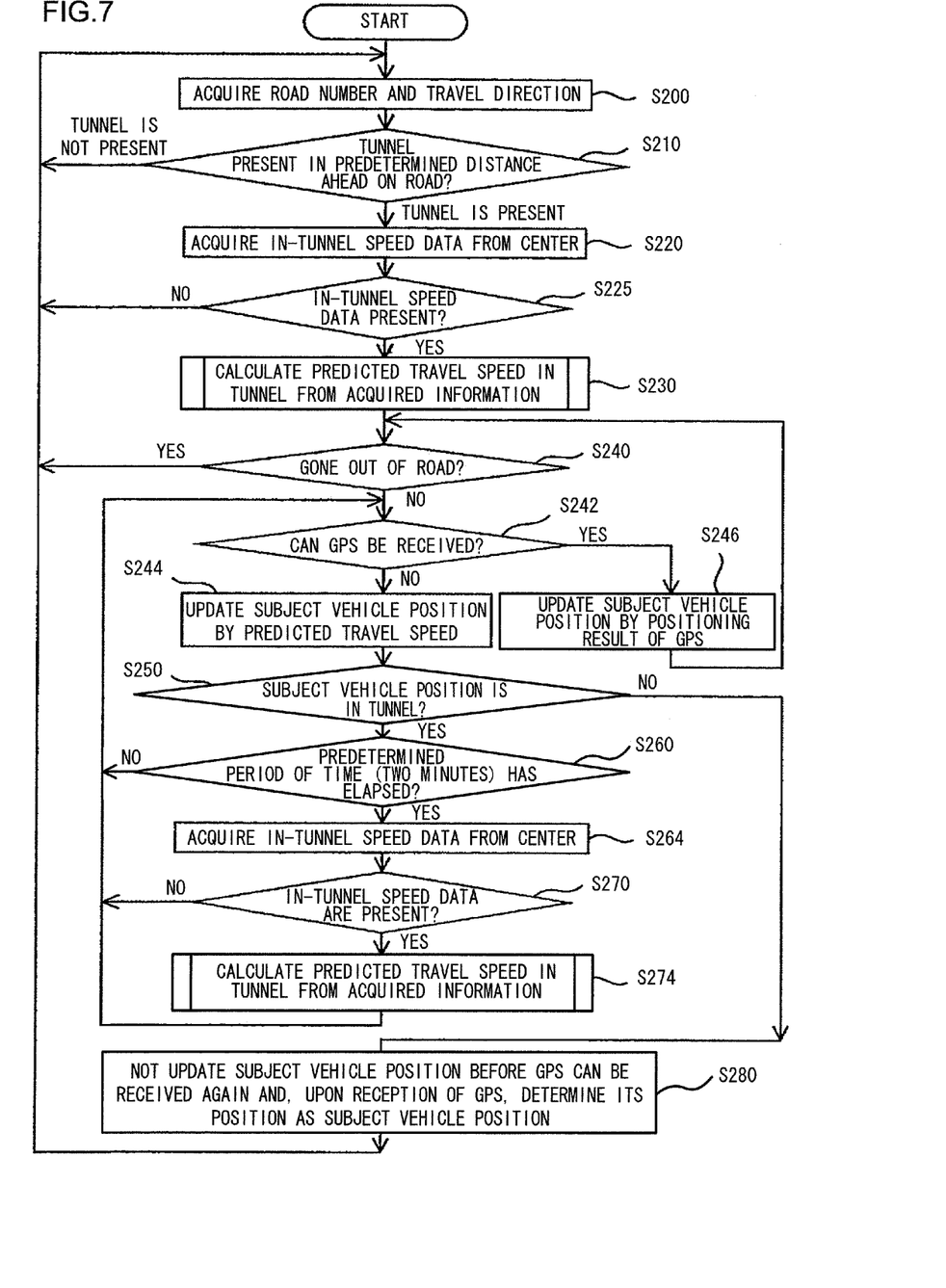
FIG. 7 A flowchart of in-tunnel speed correction processing.

FIG. 7 shows the flow of in-tunnel speed correction processing at the position estimation unit 810 of the car navigation device 70 mounted to the vehicle 30. In the car navigation device 70, the map matching unit 790 constantly calculates the road on which the vehicle 30 is traveling and the travel direction thereof based upon latitude and longitude information calculated from a GPS radio wave sequentially received at the GPS reception unit 780. The position estimation unit 810 acquires from the map matching unit 790 the road number of the road on which the vehicle is traveling and the travel direction of the vehicle that have been calculated by the map matching unit 790 (S200). Then, regarding the acquired road number, based upon information of the map DB 750, the tunnel detection unit 800 makes a decision as to whether or not a tunnel is present within a predetermined distance (e.g.: 2 km) ahead in the travel direction in the road where the vehicle is traveling (S210). If the processing by the tunnel detection unit 800 makes a negative decision, i.e., no tunnel is present within the predetermined distance ahead, the processing of S200 is repeated after a predetermined period of time. On the other hand, if a positive decision is made, i.e., a tunnel is present within the predetermined distance ahead, the tunnel number of the searched tunnel is acquired and, under control of the system control 760, this tunnel number is designated by the Internet communication unit 60 and all speed data in a measurement section that includes a part or the whole of the road section with respect to each tunnel are downloaded from the probe center 10 (S220). If the speed data of the designated tunnel have failed to be downloaded (S225: No), correction to the in-tunnel speed cannot be performed, and hence this processing is terminated and the flow of control returns to the processing of S200. If the tunnel speed data have been successfully downloaded (S225: Yes), next, the downloaded speed data are analyzed and a predicted travel speed of the vehicle 30 during traveling in the tunnel is calculated (S230). This processing will be explained in detail later with reference to FIG. 8.

Following that, a decision is made as to whether or not the vehicle 30 is making a U turn or going along a branched side road immediately before entering the tunnel, in other words, the road number acquired from the map matching unit 790 and the road number previously acquired from the map matching unit 790 are compared so as to make a decision as to whether or not the vehicle has gone out of the road (S240). If the tunnel in which the predicted travel speed was calculated is not present in the road ahead, the flow of control returns to the processing of S200. If having not gone out of the road, a reception state of the GPS reception unit 780 is checked so as to make a decision as to whether or not the vehicle 30 has entered the tunnel in which the predicted travel speed was calculated and has become incapable of receiving a GPS radio wave. If GPS radio waves from at least three or more satellites can be received (S242: Yes), based upon latitude and longitude information calculated from the GPS radio waves received at the GPS reception unit 780, the current subject vehicle position calculated by the map matching unit 790 is updated (S246), a decision is made that the vehicle has not yet entered the tunnel, and the flow of control returns to the processing of S240.

If a GPS radio wave that is necessary for positioning cannot be received (S242: No), a decision is made that the vehicle has entered the tunnel searched in S210, the current position of the subject vehicle is calculated in accordance with the predicted in-tunnel travel speed that has been calculated in advance, and display of the subject vehicle position mark 40 on the map on the display screen 31 is updated (S246). Then, a decision is made as to whether or not the subject vehicle position calculated by the predicted travel speed remains in the tunnel (S250). If the subject vehicle position remains in the tunnel (S250: Yes), a predetermined interval (e.g.: two minutes) is constantly measured from when the vehicle enters the tunnel to when the vehicle comes out of the tunnel and a decision is made as to whether or not the predetermined time interval has elapsed (S250). If the predetermined time interval has not yet elapsed (S260: No), the flow of control returns to the processing of S242. If the predetermined time interval has elapsed (S260: Yes), in-tunnel speed data are acquired from the probe center 10 similarly to those in S220 at the time interval. If the in-tunnel speed data have failed to be downloaded (S270: No), the immediately previous predicted travel speed is used and the flow of control returns to the processing of S242. If the in-tunnel speed data have been successfully downloaded (S270: Yes), speed data downloaded similarly to those in S230 are analyzed, a new predicted travel speed is calculated (S274), the flow of control returns to the processing of S242, and the processing is repeated until the vehicle comes out of the tunnel.

Then, even if a decision is made that the subject vehicle position is not in the tunnel (S250: No), there is a possibility that the vehicle has not yet come out of the tunnel in practice due to an error in position estimation based upon the predicted travel speed. For this reason, the subject vehicle position mark 40 is displayed on the display screen 31 at a position where the vehicle comes out of the tunnel, the display of the subject vehicle position is caused to remain at the same place until reception of a GPS radio wave is resumed, the subject vehicle position is not updated until reception of the GPS radio wave is resumed, and, when the GPS radio wave is received and the current position is acquired from the map matching unit 790, the current position is updated (S280).

Figure 8:
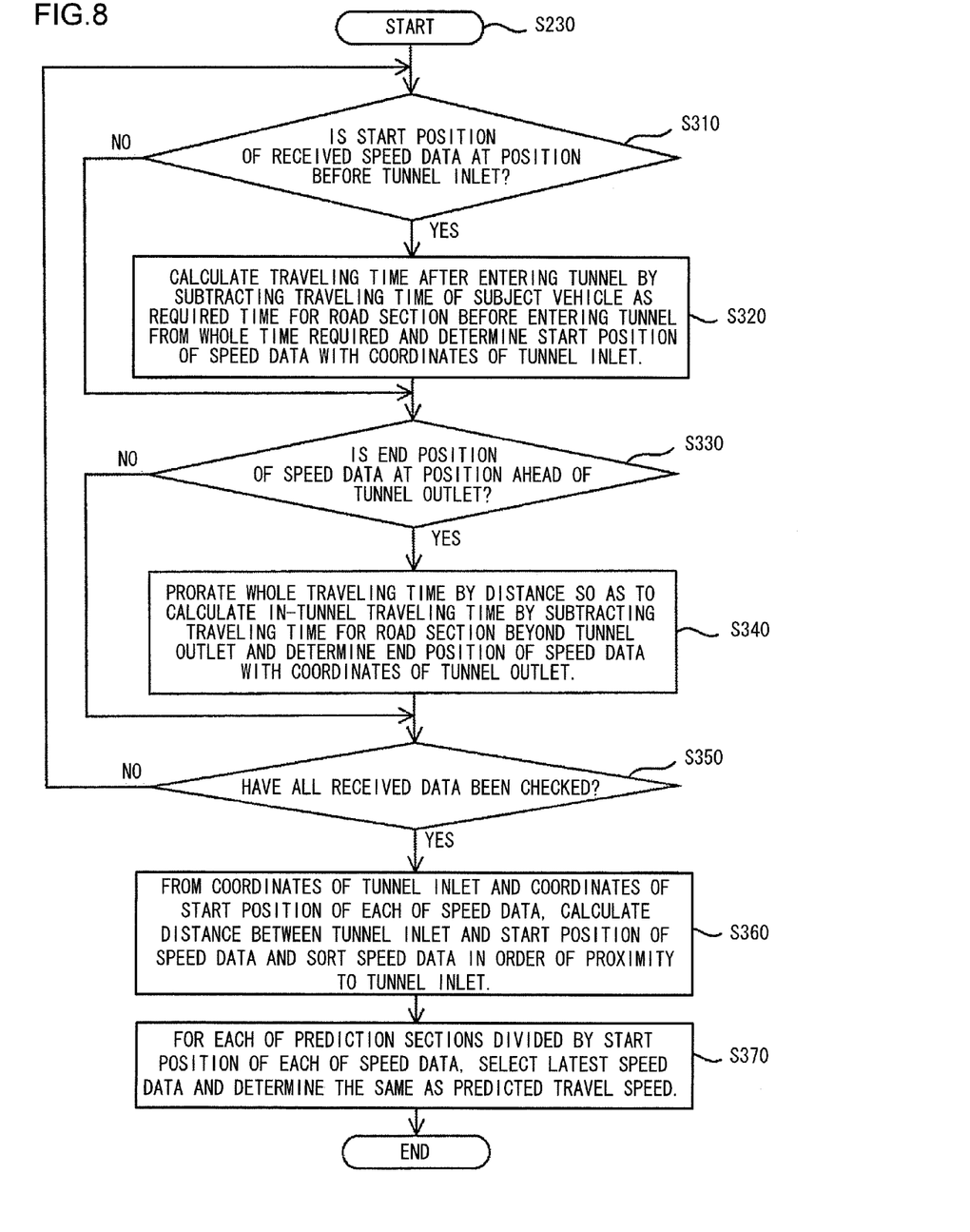
FIG. 8 A flowchart of processing to calculate an in-tunnel travel speed.

FIG. 8 shows the flow of the processing S230 for the car navigation device 70 to calculate the predicted travel speed of the vehicle 30 in the tunnel. A decision as to whether or not speed data of the section through which the vehicle travels before entering the tunnel are included in the in-tunnel speed data of the preceding other vehicle acquired from the probe center 10 is made by making a decision as to whether or not the coordinates of the start position in the speed data correspond to the road section through which the vehicle travels before entering the tunnel (S310). The period of time during which the subject vehicle has practically traveled through the section from the start position of the speed data to the tunnel inlet is subtracted from the in-tunnel speed data that include data before the vehicle enters the tunnel, the traveling time in the tunnel alone and the distance of the in-tunnel section are calculated, and the predicted travel speed is calculated. The travel speed of the vehicle traveling through an in-tunnel section is calculated by, for example, C=A−B where A denotes the whole measurement section of the in-tunnel speed data and B denotes the section through which the vehicle travels before entering the tunnel (S320). In addition, the start position of the speed data is determined as the coordinates of the tunnel inlet.

Now, the whole section A of the in-tunnel speed data acquired from the probe center 10 is 750 m and time required to travel therethrough is 30 seconds (equivalent of the speed of 90 km/h), and the section B before the tunnel through which the subject vehicle has practically traveled is 200 m and time required to travel therethrough is 9 seconds (equivalent of the speed of 80 km/h). In this case, it is deemed that the subject vehicle can travel through 550 m of the in-tunnel section C in 21 seconds, which is calculated by subtracting 9 seconds, i.e., the time required to travel through the section B, from 30 seconds, i.e., the time required to travel through the section A, (equivalent of the speed of 94.3 km/h). In other words, the time required to travel through the section A is regarded as a correct period of time during which the subject vehicle travels through the section A, and it is assumed that the subject vehicle travel through the remaining section C, which is a remaining section after the subject vehicle actually travels so as to actually measure time required to travel through the section B, in the required time that remains after subtracting the time required to travel through the section B from the time required to travel through the section A. This is because while probe information of the preceding vehicle indicates a speed that is collected by 30 seconds and averaged, the section measured by the subject vehicle assumes an actual measurement value of a section outside the tunnel and, if the traffic situation is different between outside and inside the tunnel, the accuracy in the tunnel is deemed to be improved when the actually measured section (section outside the tunnel) is subtracted.

Next, similarly to the processing of S310, a decision as to whether or not the measurement range of speed data includes a road section beyond the tunnel outlet is made based upon the coordinates of the end position of the speed data (S330). If the measurement range includes the road section beyond the tunnel outlet (S330: Yes), the traveling time of the road section ahead of the tunnel outlet is calculated by prorating the traveling time of the whole measurement section of the speed data with the ratio of the distance of the road section ahead of the tunnel outlet with respect to the distance of the whole measurement section of the speed data, the in-tunnel traveling time is calculated by subtracting the traveling time of the road section ahead of the tunnel outlet from the traveling time of the whole measurement section of the speed data, and the end position of the speed data is determined as the coordinates of the tunnel outlet (S340). In this manner, the measurement section other than the tunnel section is removed from the received speed data and an average travel speed in the tunnel section is calculated. The above processing is repeated until all the received speed data have been checked (S350).

From the coordinates of the tunnel inlet and the coordinates of the start position of the measurement section of each of the speed data, the distance between the tunnel inlet and the start position of the measurement section of the speed data is calculated, and the speed data are sorted in order of proximity to the tunnel inlet (S360). These data are classified into prediction sections defined at the start position of each of the speed data and an average travel speed in the latest speed datum in each of the prediction sections is deemed to be a predicted travel speed of the subject vehicle (S370). If there is an undefined section, the speed in the immediately previous prediction section is used. If there are no speed data in the immediately previous prediction section, the immediately previous subject vehicle speed is used.

Figure 2:
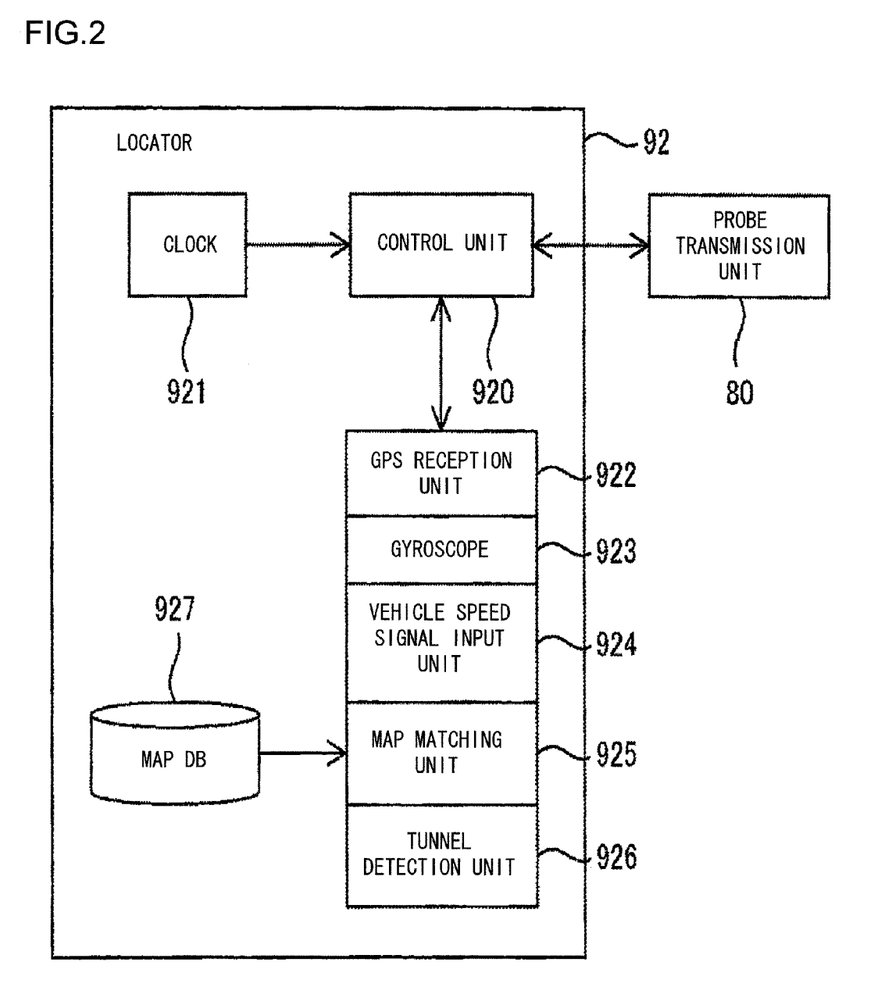
FIG. 2 A diagram that shows an internal structure of a locator 92.

The processing for the vehicle 50 to upload probe information to the probe center 10 at inlet and outlet points of a tunnel will now be explained. In a tunnel, an even in which communication with the probe center 10 is made impossible may occur. For this reason, the vehicle 50 may upload probe information to the probe center 10 at the outlet and the inlet of a tunnel. FIG. 2 shows a diagram that shows an internal structure of the locator 92 that is mounted to the vehicle 50. The locator 92 includes a GPS reception unit 922 for positioning, a gyroscope 923, and a vehicle speed signal input unit 924. The gyroscope 923 and the vehicle speed signal input unit 924 calculate a vehicle movement direction and a moved distance and, even if the GPS reception unit 922 cannot receive a GPS radio wave, the position of the subject vehicle is estimated from the calculated movement direction and moved distance. By the position information positioned by the GPS reception unit 922 and a map DB 927, a map matching unit 925 determines the road on which the vehicle is traveling and the position on the road. A tunnel detection unit 926, similarly to the tunnel detection unit 800 described earlier, detects a tunnel that is present ahead in the travel direction on the road where the vehicle is traveling. A clock 921 is to measure timing for regularly transmitting probe information to the probe center 10. A control unit 920 controls the whole locator 92.

Figure 9:
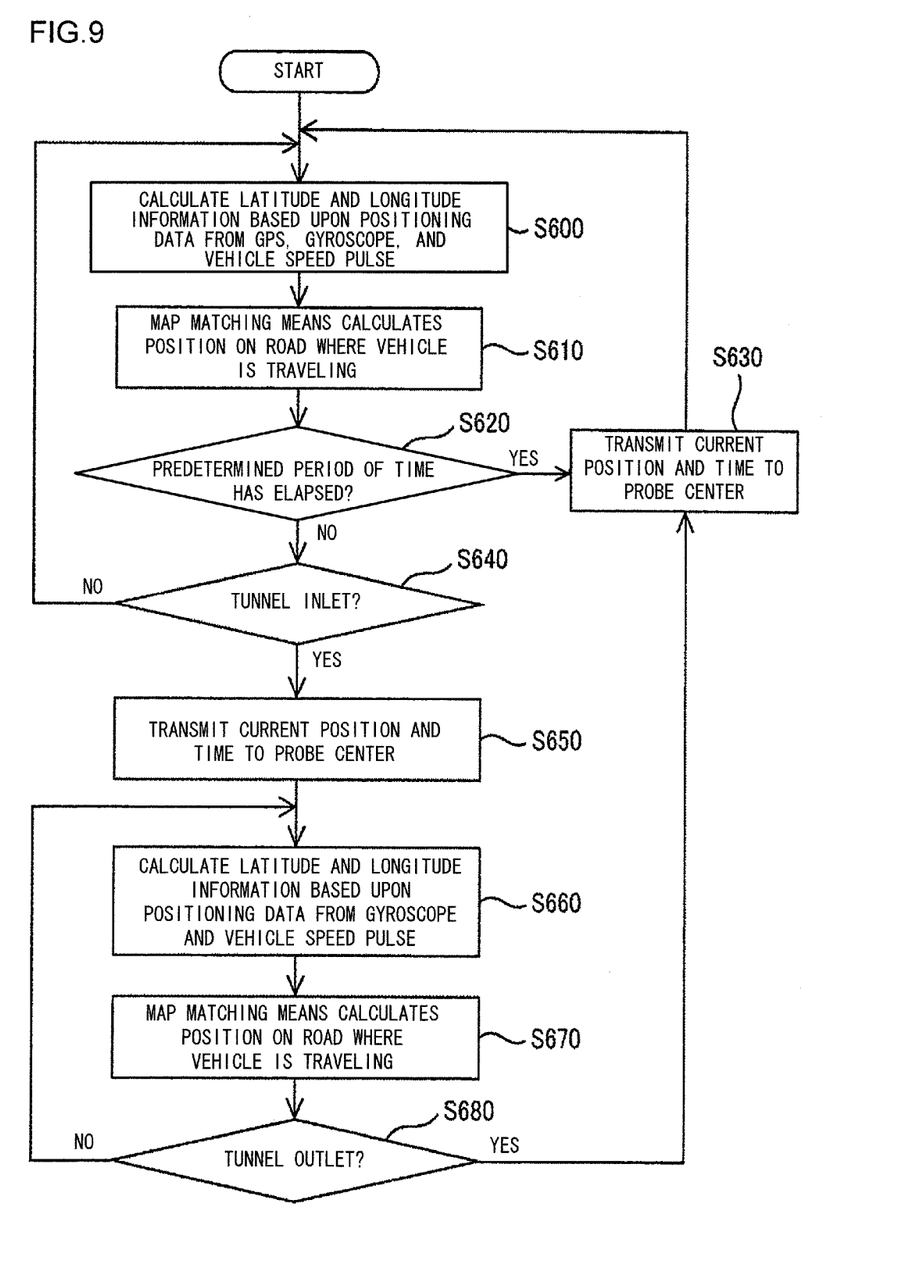
FIG. 9 A processing flowchart of the locator 92.

FIG. 9 shows a processing flow of the locator 92. The control unit 920 determines the latitude and the longitude of a current position by an output value from the GPS reception unit 922, the gyroscope 923, and the vehicle speed signal input unit 924 (S600). Based upon the positioning result, the map matching unit 925 calculates position data on the road (S610). Based upon time measured by the clock 921, the control unit 920 makes a decision as to whether or not a predetermined period of time has elapsed (S620) and transmits via the probe transmission unit 80 to the probe center 10, at the predetermined time intervals (e.g., 30 seconds), probe information in which the vehicle ID is added to the current time and the position information on the road calculated by the map matching unit 925 (S630).

Even if the predetermined period of time has not elapsed (S620: No), when the tunnel detection unit 926 has detected a tunnel inlet (S640: Yes), the control unit 920 transmits the point of time and the position information on the road to the probe center 10 as probe information (S650). Next, since if the vehicle has entered a tunnel, a GPS radio wave cannot be received, using the gyroscope 923 and the vehicle speed signal input unit 924, a movement amount of the subject vehicle position is estimated by dead reckoning, latitude and longitude information is acquired (S660), and, based upon the estimated subject vehicle position, the subject vehicle position is matched on the road by the map matching unit 925 (S670). Then, a decision is made as to whether or not the subject vehicle position matched on the road has reached the tunnel outlet (S680) and, if reached the tunnel outlet (S680: Yes), the point of time and the position information on the road are transmitted to the probe center 10 as probe information (S650). As a result, probe information is transmitted to the probe center 10 at the tunnel inlet and outlet. If a decision is made that the subject vehicle position matched on the road has not reached the tunnel outlet (S680: No), the flow of control returns to S660 and the processing is continued.

Next, as a variation of the embodiment, combination use of probe information and traffic information will be explained. The example of this case is an effective method when the number of collected pieces of probe information is small. In a section where the probe information cannot be acquired, speed data calculated from the traffic information will be used.

Figure 10:
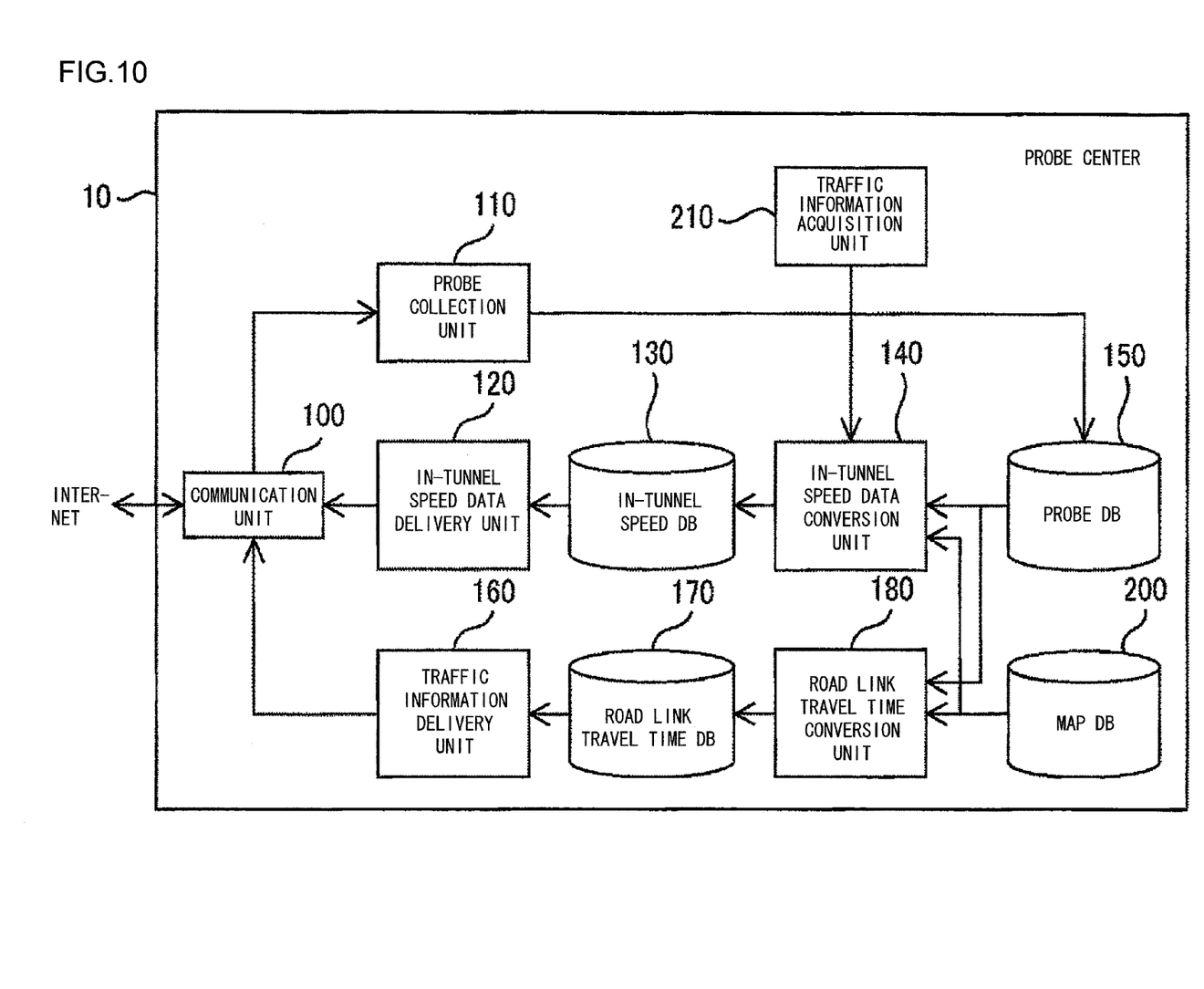
FIG. 10 A diagram that shows a structure of the probe center 10 in a variation.

FIG. 10 shows the structure of the probe center 10 for using probe information and traffic information in combination. A traffic information acquisition unit 210 for acquiring external traffic information is added to the structure of probe center shown in FIG. 3. It is assumed that a correspondence relation with which a road corresponding to the acquired traffic information is specified is stored in the map DB 200.

Figure 11:
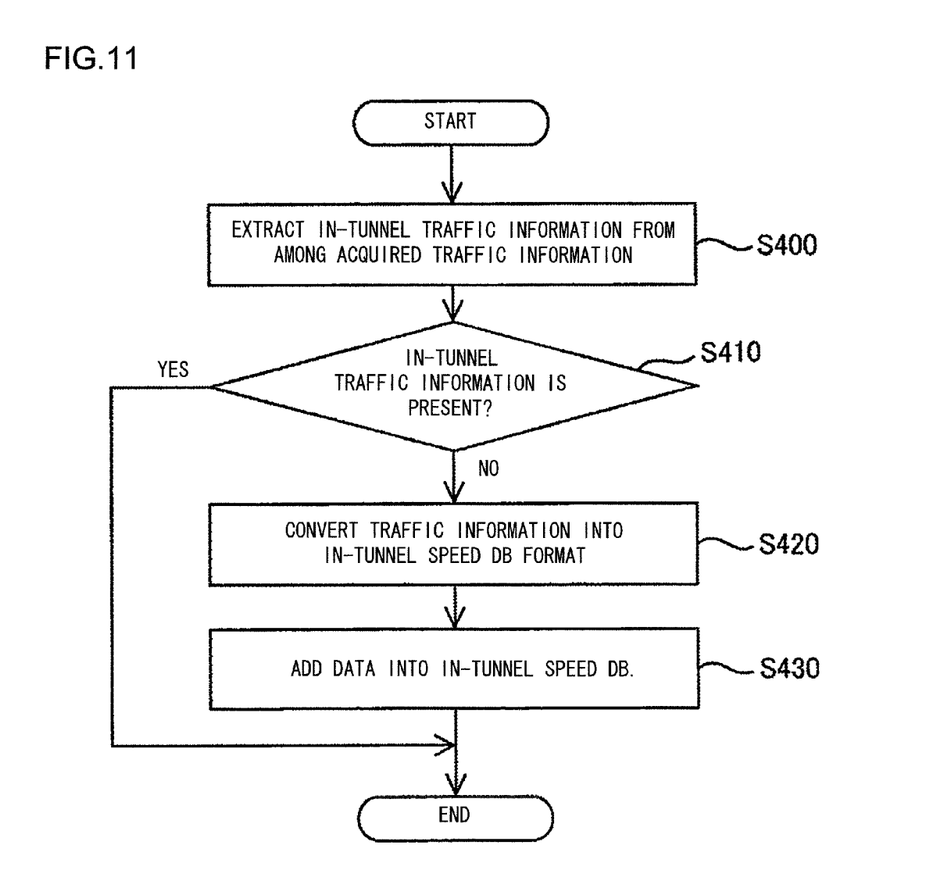
FIG. 11 A flowchart of processing in which probe information and traffic information are used in combination.

FIG. 11 is a flowchart of the processing in which probe information and traffic information are used in combination by the probe center 10. From among traffic information other than probe information such as regularly acquired Traffic Information, data of a road section in which a tunnel is present are extracted (S400). A decision is made as to whether or not speed data of a tunnel that corresponds to the extracted data are stored in the in-tunnel speed DB 130 or whether or not a section is lacking partially, and traffic information of a tunnel in which speed data by the probe are not present is extracted (S410). If a part or the whole of in-tunnel speed data that correspond to the extracted traffic information is lacking, those data are converted into data that correspond to FIG. 5. For instance, traffic information is provided with average speed and measurement time for each road link. Accordingly, the measurement time is directly entered into a time field (S420). A value in the speed field is determined by calculating the speed from link travel time and a length of the link, and a start position and an end position are determined by extracting from the map DB 200 position information of the inlet and outlet of a tunnel section of the road link (S430). This allows the car navigation device 70 to perform processing without any change from the first embodiment.

Next, as another variation of the embodiment, an example in which the vehicle 30 directly acquires, not via the probe center 10, speed data from the other vehicle 50 that is traveling in the vicinity will be explained. In the example of this case, since the car navigation device 70 can regularly acquire in-tunnel speed data from the vehicle 50 in the vicinity, data of the vehicle 50 in the vicinity can be directly deemed as a speed of the subject vehicle (the vehicle 30), thereby eliminating the need of the probe center 10 and simplifying the processing of the car navigation device 70.

In this example, in addition to the components used in the embodiment that has been explained, an inter-vehicle communication unit that allows communication to be performed between vehicles is mounted to the vehicle 30 and the inter-vehicle communication unit is mounted to the vehicle 50 similarly. A communication distance between these inter-vehicle communication units covers a range of a few hundred meters, and the vehicle 30 uses these inter-vehicle communication units to acquire speed data from the vehicle 50.

Figure 12:
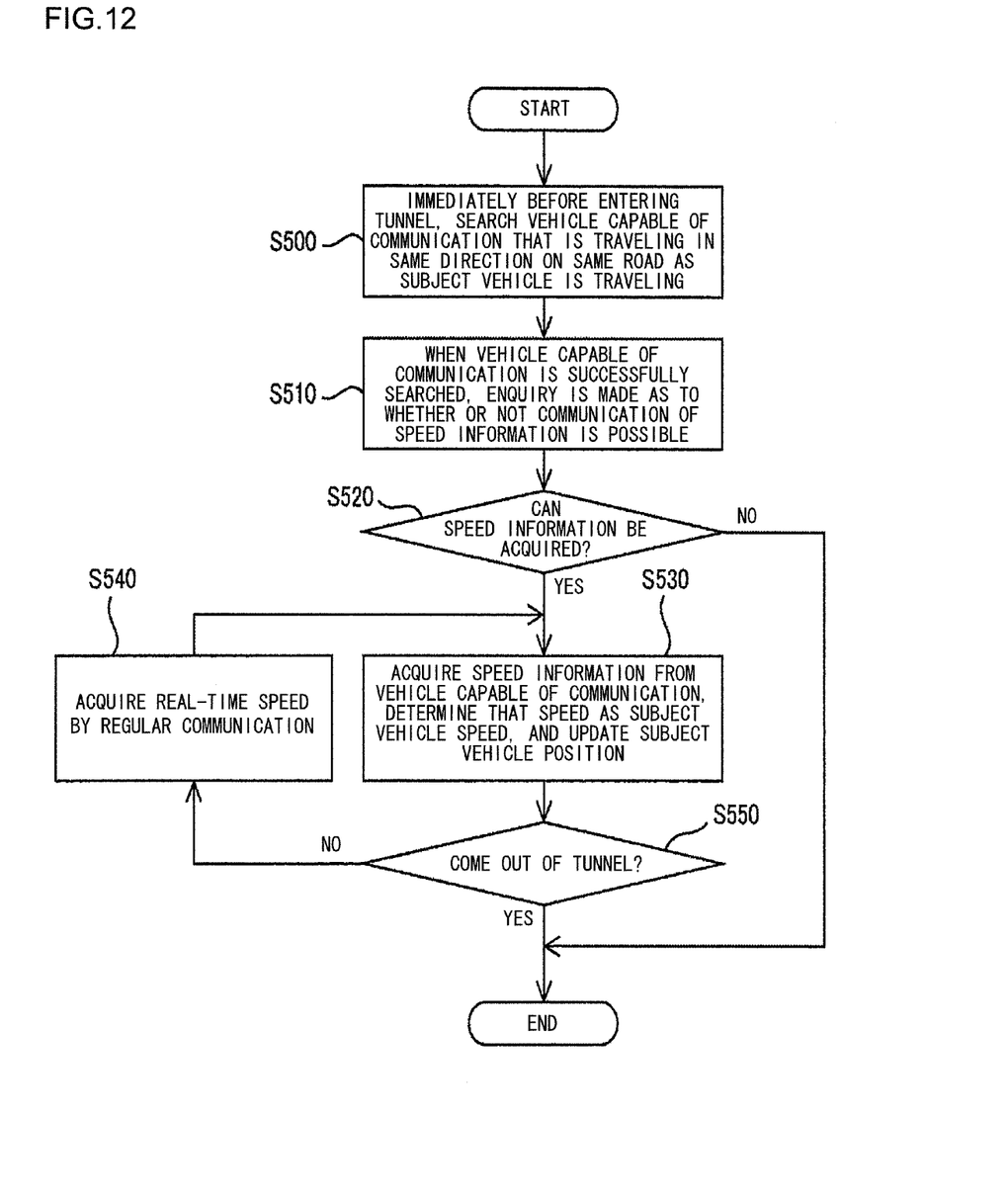
FIG. 12 A flowchart that shows processing to acquire speed data directly from a vehicle 50 in the vicinity.

FIG. 12 is a flowchart that shows processing in which the car navigation device 70 that is mounted to the vehicle 30 acquires speed data directly from the vehicle 50 in the vicinity. Firstly, before the subject vehicle enters a tunnel, a vehicle capable of communication that is traveling in the same direction on the same road as those of the subject vehicle is searched (S500). In this case, the other vehicle may be a preceding vehicle or a following vehicle. Next, after a vehicle capable of communication has been searched, an enquiry is made as to whether or not communication of speed information is possible (S510). This is because a vehicle from which speed information can be acquired is limited to a vehicle whose locator 92 is capable of Dead-Reckoning even in a tunnel and that permits speed information to be provided to another vehicle. If the vehicle 30 can acquire speed information (S520), the speed information is acquired from that vehicle, the subject vehicle estimation position is determined with the speed deemed as the subject vehicle speed, and display of the subject vehicle position mark 40 on a map on the display screen 31 is updated. Until the subject vehicle comes out of the tunnel (S550), the car navigation device 70 regularly performs communication at intervals of a few seconds to a few minutes (for example, intervals of 30 seconds) and acquires real-time speed information (S540).

The car navigation device 70 of the present embodiment described above acquires in-tunnel speed information from another vehicle that is capable of Dead-Reckoning and estimates the subject vehicle speed. In most cases, in-tunnel positioning does not require consideration on planar extent in terms of two-dimensional space, and thus the position estimate may be performed on the road that is deemed as a line. Then, in order to estimate an in-tunnel subject vehicle position, if a speed of another vehicle in the tunnel can be acquired, the subject vehicle is deemed to be traveling in the tunnel at the same speed as that of the other vehicle and, in place of an absolute position of the subject vehicle, based upon the speed of the other vehicle, a movement amount is calculated and an in-tunnel position is estimated.

Then, the vehicle position is regularly transmitted in advance from a vehicle capable of in-tunnel Dead-Reckoning to the probe center as probe information. Before entering a tunnel, the subject vehicle incapable of in-tunnel Dead-Reckoning acquires from the probe center probe information that corresponds to a record of travel in the tunnel where the vehicle is to enter now, calculates the in-tunnel travel speed from the probe information, and determines the speed as the subject vehicle speed. In a section where probe information is not present, traffic information is used or, if vehicles can directly communicate with each other, an in-tunnel travel speed is acquired from a vehicle in the vicinity that is capable of Dead-Reckoning, thereby estimating the in-tunnel travel speed. Then, based upon the estimated travel speed, a movement amount of the subject vehicle is calculated and the subject vehicle position is estimated.

According to the present invention described above, advantageous effects that the car navigation device 70, which is not inclusive of a Dead-Reckoning unit such as a gyroscope and not operable of positioning in a tunnel, becomes operable to estimate an in-tunnel travel speed and the car navigation device 70 becomes operable to perform correct guidance are achieved.

Although the variety of embodiments and examples of variations are described above, the present invention is not to be limited only to those contents. The scope of the present invention includes other possible embodiments invented within the scope of the technical idea of the present invention.

The disclosure of the following priority application is herein incorporated by reference:
Japanese Patent Application No. 2010-038103 (filed on Feb. 24, 2010)

The invention claimed is:

1. A navigation device that includes a map data base in which map information is stored and a positioning unit that determines a current position based upon a radio wave signal received from a satellite, comprising:
    a tunnel detection unit that detects a tunnel that is present ahead on a road where the navigation device is moving;
    a travel data acquisition unit that acquires travel data of another vehicle from an information center; and
    a position estimation unit that in case the tunnel detection unit detects a presence of a tunnel ahead on a road where the navigation device is moving and the travel data acquisition unit acquires from the information center travel data of another vehicle that has traveled through the detected tunnel, estimates a current position of the navigation device in the detected tunnel using a travel speed in the detected tunnel in the acquired travel data as a movement speed of the navigation device; wherein
    the travel data acquired from the information center include position information of another vehicle and time information of measurement of the position information; and
    if the acquired travel data include sets of travel data by a plurality of vehicles, the position estimation unit sorts sets of speed information of sections that each correspond to the tunnel in each set of travel data in order of proximity to an inlet of the tunnel, calculates speed information for each of sections divided by the position information, and determines latest speed information in each of the divided sections as a movement speed of the navigation device in each of the divided sections of the tunnel.

2. A navigation device according to claim 1, wherein:
    for a section in the tunnel where speed data cannot be acquired from travel data of the other vehicle, speed information, which is speed data into which traffic information pertaining to the tunnel has been converted, is acquired from the information center and is determined as a movement speed of the navigation device.

3. A navigation device according to claim 1, further comprising:
    an inter-vehicle communication unit that performs data transmission and reception with another vehicle, wherein:
    in case the tunnel detection unit detects a presence of a tunnel ahead on a road where the navigation device is moving, the inter-vehicle communication unit performs communication with another vehicle that is traveling in a same direction on a same road and the position estimation unit determines a travel speed received from the other vehicle as a movement speed of the navigation device.

4. A position estimation method for a navigation device that comprises a map data base in which map information is stored and a positioning unit that determines a current position based upon a radio wave signal received from a satellite, comprising:

detecting a tunnel that is present within a predetermined distance ahead on a road where the navigation device is moving;

in case a presence of a tunnel is detected ahead on a road where the navigation device is moving, acquiring from an information center travel data of another vehicle that has traveled through the detected tunnel; and estimating a current position of the navigation device in the tunnel using a travel speed in the tunnel in the acquired travel data as a movement speed of the navigation device; wherein the travel data acquired from the information center include position information of another vehicle and time information of measurement of the position information; and if the acquired travel data include sets of travel data by a plurality of vehicles, sets of speed information of sections that correspond to the tunnel in each set of travel data are sorted in order of proximity to an inlet of the tunnel, speed information is calculated for each of sections divided by the position information, and latest speed information in each of the divided sections is determined as a movement speed of the navigation device in each of the divided sections of the tunnel.

5. A position estimation method for a navigation device according to claim 4, wherein:

for a section in the tunnel where speed data cannot be acquired from travel data of the other vehicle, speed information, which is speed data into which traffic information pertaining to the tunnel that has been converted, is acquired from the information center and determined as a movement speed of the navigation device.

6. A position estimation method for a navigation device according to claim 4, wherein:

in case a presence of a tunnel is detected ahead on a road where the navigation device is moving, communication with another vehicle that is traveling in a same direction on a same road is performed by an inter-vehicle communication in which transmission and reception of data is further performed with a vehicle, and a travel speed received from the other vehicle is determined as a movement speed of the navigation device.

* * * * *